(12) United States Patent
McFarlin, Jr. et al.

(10) Patent No.: US 6,318,936 B1
(45) Date of Patent: Nov. 20, 2001

(54) PLUNGE ROUTER ADJUSTMENT MECHANISM AND METHOD

(76) Inventors: Robert E. McFarlin, Jr., 2622 E. 30th St., Des Moines, IA (US) 50317; David L. Henderson, 3641 NE. 56th Pl., Berwick, IA (US) 50032

( * ) Notice: Subject to any disclaimer, the term of this patent is extended or adjusted under 35 U.S.C. 154(b) by 0 days.

(21) Appl. No.: 09/593,317

(22) Filed: Jun. 13, 2000

(51) Int. Cl.[7] ............................................. B23C 1/20
(52) U.S. Cl. ................. 409/131; 144/136.95; 144/154.5; 409/182; 409/206
(58) Field of Search ........................... 144/154.5, 136.95; 409/131, 132, 204, 206, 210, 229, 138, 175, 178, 180, 181, 182

(56) References Cited

U.S. PATENT DOCUMENTS

| | | |
|---|---|---|
| 1,565,790 * | 12/1925 | Carter .................................... 409/182 |
| 1,611,381 * | 12/1926 | Salsbury ............................... 409/182 |
| 1,820,162 | 8/1931 | Salvat . |
| 1,882,586 | 10/1932 | Haynes . |
| 1,960,699 | 5/1934 | Galloway . |
| 2,625,844 | 1/1953 | Beckett et al. . |
| 4,239,428 | 12/1980 | Berzina . |
| 4,410,022 | 10/1983 | Peterson . |
| 4,440,050 | 4/1984 | Kagerer . |
| 4,770,573 | 9/1988 | Monobe . |
| 5,056,375 | 10/1991 | Kapton et al. . |
| 5,139,061 | 8/1992 | Neilson . |
| 5,191,921 | 3/1993 | McCurry . |
| 5,590,989 | 1/1997 | Mulvihill . |
| 5,725,036 | 3/1998 | Walter . |
| 5,725,038 | 3/1998 | Tucker et al. . |
| 5,853,274 | 12/1998 | Coffey et al. . |
| 5,918,652 | 7/1999 | Tucker . |
| 5,997,225 | 12/1999 | Young et al. . |
| 6,079,915 * | 6/2000 | Bosten et al. ........................ 409/182 |

OTHER PUBLICATIONS

Instruction Manual—ROUT–R–LIFT™; Date—Unknown; pp. 1–4; JessEm Tool Company, 171 Robert St. E.#7 & #8, Penetanguishene, ON, L9M 1G9 Canada a Division of JessEM Products, Ltd.

Catalog 51, Printed in Canada, Copyright ®2000, Jesada Tools™; Jesada Tools, 310 Mears Boulevard, Oldsmar, FL 34677; Date—Unknown; p. 6, "ROUT–R–LIFT".

* cited by examiner

Primary Examiner—Daniel W. Howell
(74) Attorney, Agent, or Firm—Zarley, McKee, Thomte, Voorhees & Sease (57) ABSTRACT

A plunge router adjustment mechanism including a drive shaft longitudinally fixed but rotatable in a base plate and extending towards an opposite end of the plunge router. A carriage moveable along the drive shaft is connectable to the router housing. Optionally, a sub-carriage, moveable along the carriage and directly attached to the housing, allows fine adjustment of the housing relative to the base plate. Optionally a coarse adjustment stop member is releasably fixable along the drive shaft for coarse positioning of the housing relative to base plate.

31 Claims, 7 Drawing Sheets

PLUNGE ROUTER ADJUSTMENT MECHANISM AND METHOD

BACKGROUND OF THE INVENTION

1. Field of the Invention

The invention relates to plunge routers, and in particular, to an improved mechanism and method of adjusting the base-plate of the router relative to the bit of the router.

2. Problems in the Art

Router mechanisms have a wide range of applications, particularly with respect to woodworking. A particular type of router is called a plunge router. For example, U.S. Pat. No. 4,770,573 to Monobe, discloses a basic configuration of such routers. A base plate is used to support the router against the surface to be routed. A bit is usually centered the in base and is rotated by a motor. Handles are used to grip the router if it is used in a freestanding mode.

As set forth in U.S. Pat. No. 4,770,573, incorporated by reference in its entirety herein, a unique aspect of plunge routers is that they utilize support members or columns in between the base and the main housing. The support columns are longitudinally slideable in receiving chambers. Springs push against the interior ends of the support columns to urge them outwardly and thus bias the base away from the housing of the router. This arrangement allows the base to be positioned in a normal position such that the bit does not extend past the plane of base. The base of the plunge router can therefore be placed on a surface to be routed and then force applied to the router housing (against the springs) to move the bit down to the work surface to start routing in the middle of a work surface. Without such an arrangement, it would be very difficult to maneuver a router to a precise starting point on the interior of a surface to be routed.

Note, however, that it is sometimes desirable to invert a plunge router and install it upside down in a table or other support so that it could be used as a table router. An example of such an arrangement is disclosed in Neilson U.S. Pat. No. 5,139,061, incorporated by reference in its entirety herein. Plunge routers have the flexibility of being used in a portable, hand-guided manner (See Monobe U.S. Pat. No. 4,770,573) or in a table-mounted orientation (Neilson U.S. Pat. No. 5,139,061).

Conventionally, plunge routers allow some adjustment of the position of the base relative to the bit. As can be seen in Monobe U.S. Pat. No. 4,770,573, and also in Walter U.S. Pat. No. 5,725,036, incorporated by reference in its entirety herein, the normal bit adjustment is a knob at the end of a threaded rod, which extends along the motor housing of the plunge router. The operator can turn the knob to move the base farther away or closer to the bit as desired. While such an arrangement is fairly satisfactory when the plunge router is used in the hand-manipulated mode, it is cumbersome to adjust when the plunge router is used in the fixed table-mode like Neilson U.S. Pat. No. 5,139,601. The operator many times has to reach underneath the table and it is sometimes difficult to locate the knob to adjust the router.

This very problem is recognized in U.S. Pat. No. 5,918, 652 to inventor Tucker. The solution in Tucker is utilization of a complex assembly, including a lever arm, that still would be positioned under a router table if the plunge router were used in that manner. Tucker represents a relatively costly and complex attempted solution that is not entirely satisfactory.

The Monobe patent discloses the basic structure of a plunge router and one method of adjusting base plate to bit distance. As with most plunge routers, Monobe illustrates the problem with adjustment requiring turning of a knob attached to a threaded rod at a location on the router opposite the base plate. She operator is basically adjusting the bit relative to the base plate from a position almost as remote as possible from the location of the bit. In routing, it is many times, if not most times, important to have very precise positioning of the bit relative to the base. The Monobe-type adjustment mechanism not only makes it difficult to have precise adjustment (because it makes it difficult for the operator to both accurately view or measure bit location relative to the base while also operating the adjustment mechanism), but also the arrangement in combination with the plunge router makes it difficult to hold or position the plunge router during adjustment. For example, if the base plate is placed on top of a table, adjustment of the bit lower than the base plate is not possible. If the router is inverted with its opposite end placed on the table, the adjustment mechanism many times extends below the plane of the end of the router. One must therefore place the router near the edge of the table so that the adjustment mechanism extends lower than the table or bench top. The operator must maintain and support the router with one hand and operate the adjustment with the other while attempting to monitor bit height. This is difficult. If the router is laid on its side, many times it makes it difficult for the adjustment to be accessed or easily operated. The base is then usually lying at an oblique angle making it more difficult to measure the bit height. Again, as previously mentioned, if the router is mounted in an inverted fashion in a router table, it is cumbersome and difficult to reach under and adjust the bit height.

Neilson attempts to address this issue by placing a threaded rod through a support column which has an end accessible for connection to a rotary crank at the table surface. This modification allows adjustment of bit height from on top of the table. However, it makes it very difficult to adjust bit height when the router is used in a hand-held mode. Also it is very cumbersome and slow to crank the router housing from a fully extended position up to a position where the bit extends above the router table surface. Thus, the Neilson arrangement is basically dedicated to router table use of the router. The Walter adjustment conversion kit requires modifications of the plunge router that eliminates some of the normal plunge router functions.

OBJECTS, FEATURES AND ADVANTAGES OF THE INVENTION

The inventors therefore have identified the need for easier adjustment, both when a plunge router is used in a hand-held mode and in a table-mounted mode. They also identified the need for such a feature that could be retrofitted to existing plunge routers. Furthermore, they recognized the need for a universal solution for the problem.

Therefore, a real need for an improvement in the art for adjustability of plunge routers exists. It is therefore a principal object of the invention to provide a mechanism and method for plunge router adjustment that improves over or solves problems or deficiencies in the art. Other objects, features, and advantages of the invention include a mechanism and method for adjusting plunge routers which:

a. Allows adjustment from opposite ends of plunge router.

b. Retains most or all of conventional plunge router features.

c. Provides improved adjustability whether in hand-held or table mount mode.

d. Allows the adjustment point on the router to be in closer proximity to the bit.

e. Makes adjustment of the bit more in line-of-sight of the operator.

f. Is essentially universal in nature; and can be retrofitted or installed as original equipment on most models and types of plunge routers.

g. Can optionally be configured to have a rapid coarse adjustment feature while retaining an independent fine adjustment feature.

h. Is non-complex.

i. Is efficient.

j. Is economical.

k. Is durable.

These and other objects, features, and advantages of the present invention will become more apparent with reference to the accompanying specification and claims.

SUMMARY OF THE INVENTION

The present invention includes a plunge router adjustment mechanism and method for adjusting router base plate to bit distance. The mechanism includes components accessible from both the base end and the opposite end of the router to adjust and fix the distance between base and the housing over a range of positions. An optional feature includes a component to adjust the distance between base and housing over a subset of that range. The mechanism can be retrofitted or built-in as original equipment to the router. The mechanism can be placed external or internal of a plunge guide member of the plunge router.

The method according to the invention includes providing adjustment capability from either the base plate or opposite end of the plunge router. Optionally, further adjustment of base plate to bit distance can be provided over a subset of the range of possible movement.

DETAILED DESCRIPTION OF PREFERRED EMBODIMENTS

Overview

In order to obtain a better understanding of the invention, preferred embodiments will now be described in detail. These embodiments represent examples of the form the invention can take and are not inclusive.

Frequent reference will be taken to the accompanying drawings. Reference numbers and letters will be used to indicate certain parts and locations in the drawings. The same reference numbers and letters will be used to indicate the same parts and locations throughout the drawings unless otherwise indicated.

General Environment

The preferred embodiments will be described with respect to conventional plunge routers. Examples can be seen at the Walter, Neilson, Monobe and Tucker patents previously mentioned and incorporated by reference herein.

A detailed description of conventional plunge routers and their structural content and cooperation will not be set forth here, as it is well known in the art. The embodiments will be described with the understanding that the embodiments can be used either in a retrofitted application or as original equipment to plunge routers. Furthermore, the embodiments can be used whether the plunge router is operated in a hand-held mode or installed in a router table other and all router applications, e.g. pin routers, pantographs, mortising machines, etc.

The embodiments have been shown and described relative to essentially a generic plunge router. The embodiments are applicable to a wide variety, if not most, brands, models, and configurations of plunge routers.

Structure

Figure 1:
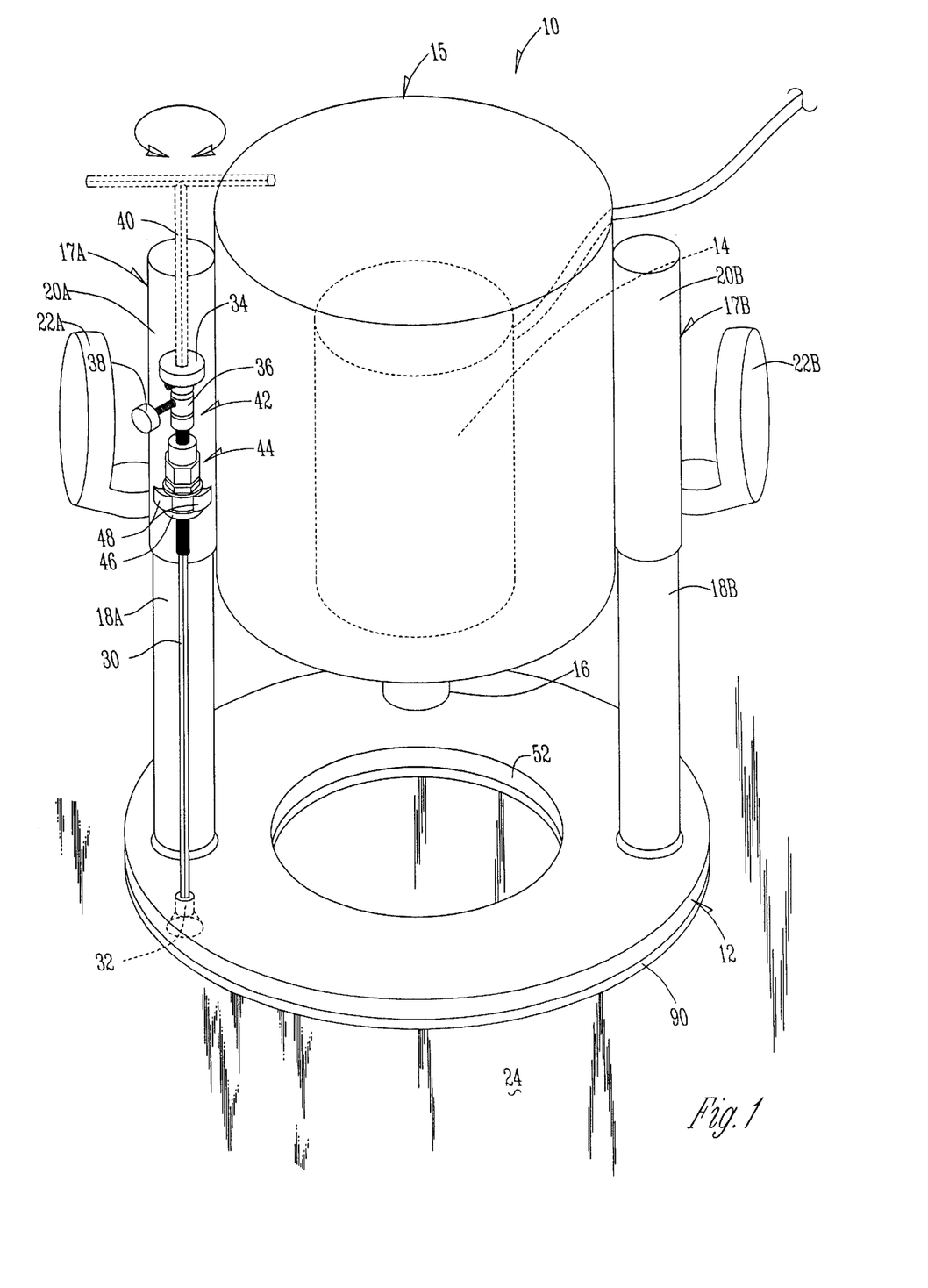
FIG. 1 is a perspective depiction of a plunge router including an embodiment of an adjustment mechanism according to the present invention, and including a depiction in ghost lines of an adjustment tool for the adjustment mechanism accessible from both the plunge router base plate and the end of the plunge router opposite the plunge router base plate.

FIG. 1 illustrates a plunge router 10 including these major components: a base plate 12 (with a sub-base plate 90 removeably attached by machine screws or bolts to base plate 12); a motor 14 with housing 15; a bit chuck 16; plunge guide members 17A and 17B (which comprise support columns 18A and 18B extending between base plate 12 receivers 20A and 20B, which are attached to housing 15); and handles 22A and 22B. All of this structure is conventional with regard to plunge routers. In FIG. 1, plunge router 10 is set base down on a tabletop or bench top 24. Springs (not shown) would exist in receivers 20A and 20B, and urge support columns 18A and 18B away from receivers 20A and 20B. This also is as conventional with plunge routers.

As shown in FIG. 1, in a normal or default position, the plunge guide assembly (including plunge guide members 17A and 17B) operates to bias housing 15 away from base plate 12.

For normal sized bits and bit chuck 16, the bit (not shown) would then not reach into or through opening 52 in base plate 12. Base plate 12 could then be placed upon a surface such as surface 24, even while router motor 14 is turning bit chuck 16, without the bit and bit chuck 16 touching surface 24. An operator can therefore position and support router 10 on a surface 24 to be routed and then apply manual downward force on handles 22A and 22B, against the upward biasing force of the springs in plunge guides 17A and 17B, and in a controlled manner move a bit in bit chuck 16 down into surface 24. This is a primary functional advantage of plunge routers.

In this mode, it is important that the maximum depth a bit in bit chuck 16 can reach in surface 24 be precisely set. As previously discussed, most plunge routers have some sort of stop or bit depth adjustment mechanism for this purpose.

FIG. 1 illustrates an adjustment mechanism according to an embodiment of the invention. An elongated drive shaft 30 extends from drive cap 32 and base plate 12 along housing 15 to an opposite end consisting of main adjustment collar/drive 34. Drive shaft 30 is unthreaded, but may have a cross-sectional geometric shape such as hexagonal. In this embodiment, an insert 71 fixed in end 70 of lead screw 42 has a mating interior hex bore so that lead screw 42 turns with drive shaft 30. Alternately, lead screw 40 could be a solid, one-piece machined component. Drive cap 32 is beveled and fits in a mating beveled aperture 58 (see FIG. 3A) in the outer face of base plate 12. Drive cap 32 can be prevented from longitudinal movement relative to drive rod 30 (e.g. by lock ring or push-on shaft retainer clip 25B (See FIG. 6A)) and therefore is longitudinally fixed in base plate 12.

Main adjustment collar/drive 34 is removably fixed (e.g. by a set screw) to the end of drive shaft 30 away from base plate 12. A coarse-adjust collar 36, slideable along drive shaft 30, can be quickly fixed in place along drive shaft 30 by set screw 38.

Drive cap 32 and main adjust collar/drive 34 both contain drive sockets 54 and 56 respectively (See FIGS. 4A and 4D) which are adapted to receive hexagonal-in-cross-section mating drive tool 40. Drive tool 40 can thus be installed at either end of drive shaft 30 and its handle turned to rotate drive shaft 30. Different geometric cross sections are possible.

A lead screw 42 is installed to slide on drive shaft 30. A fixing nut 44 having an internal thread mating with the external thread of lead screw 42 can be threadably adjustable along lead screw 42. An adapter-bushing 46 is also installed around drive shaft 30 and lead screw 42, and has an end adjacent to fixing nut 44 that is externally threaded and matable with internal threads in a section of fixing nut 44.

Figures 3A, 4A, 4B, 4C, 4D:
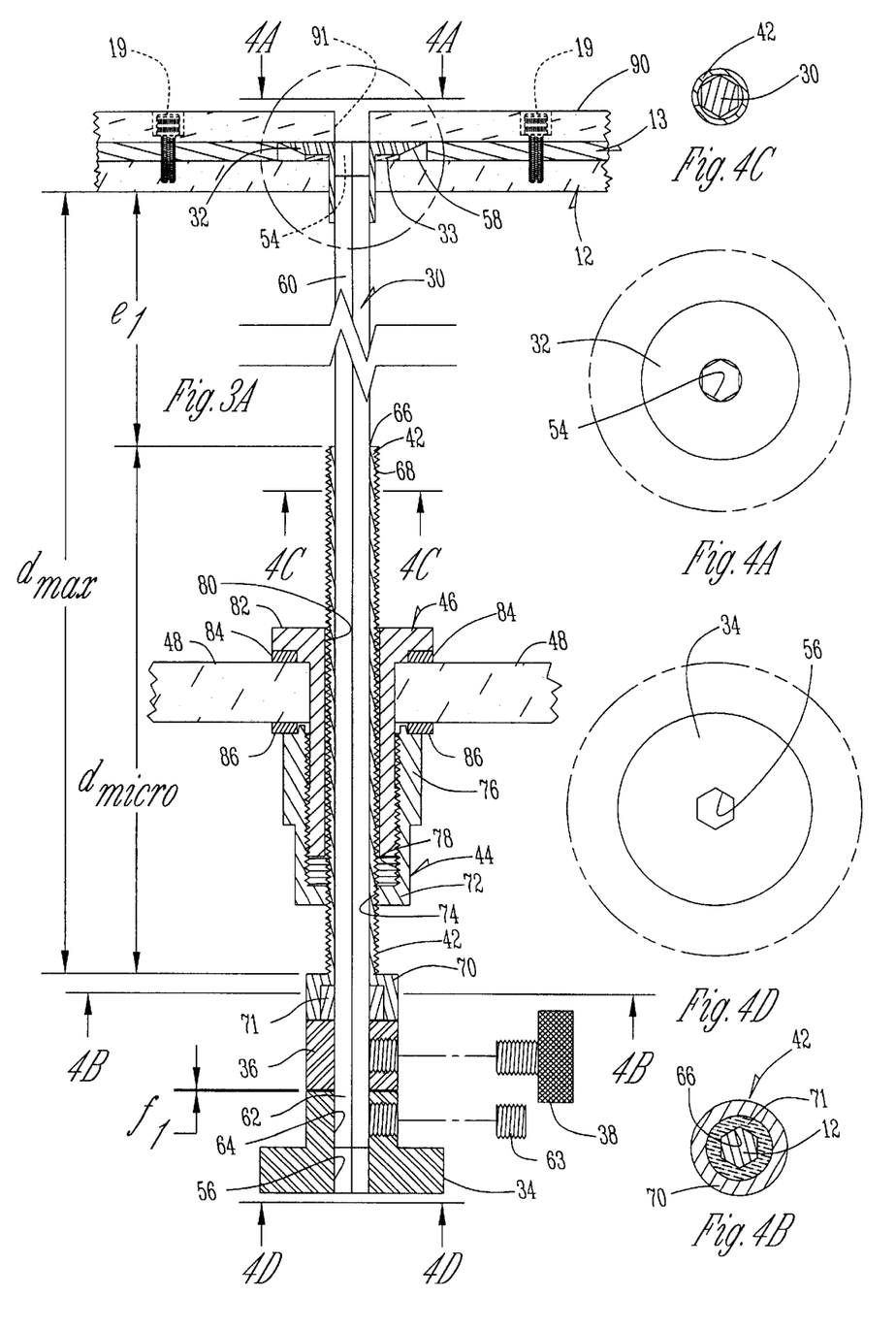
FIG. 3A is an enlarged sectional view of the adjustment mechanism of FIGS. 1 and 2 mounted in a router table.
FIG. 4A is an enlarged plan view taken along line 4A—4A of FIG. 3A.
FIG. 4B is an enlarged sectional view taken along line 4B—4B of FIG. 3A.
FIG. 4C is an enlarged sectional view taken along line 4C—4C of FIG. 3A.
FIG. 4D is an enlarged plan view taken along line 4D—4D of FIG. 3A.

As illustrated in FIGS. 1 and 3A, this arrangement allows for fixing nut 44 and adapter-bushing 46 to be threadably and longitudinally moved towards one another along lead screw 42. This arrangement serves to provide a clamping action. The configuration of fixing nut 44 and adapter-bushing 46 allows those pieces to clamp, for example, opposite portions of a boss or casting ear 48 that extends from housing 15.

Thus, when installed as shown in FIG. 1, one end of drive shaft 30 is longitudinally fixed relative to base plate 12 at drive cap 32. Fixing nut 44 and adapter-bushing 46 are longitudinally fixed relative to housing 15 by clamping onto boss or casting ear 48 of housing 15. Fixing nut 44 is threadably engaged with lead screw 42, which, again, is slideable along drive shaft 30.

It should be noted that in FIG. 1, coarse-adjust collar 36 is fixed in position on drive shaft 30 in abutment with main adjust collar/drive 34. Therefore, all the normal functions of plunge guide members 17A and 17B can be enjoyed. Housing 15 can be moved over a range of positions from that shown in the fully extended position in FIG. 1, to a position where bit chuck 16 moves towards base plate 12 until the top of lead screw 42 comes into abutment with the adjacent side of coarse-adjust collar 36. In that position, no further convergence of housing 15 and base plate 12 is allowed. Thus, the mechanism described herein provides a limit or stop, as far as maximum plunging of the bit is concerned. If collar 36 is fixed in place against collar/drive 34, maximum plunging is allowed.

It is preferred that the length of drive shaft 30 and the size of the other components described herein, would allow for all normally desired plunging distances for the plunge router to which it is installed. Shaft 30 can be cut to desired length. For example, a 12"shaft 30 could be provided with a retrofit kit. The installer could cut shaft 30 to a desired length for a particular router. Of course, housing 15 could never move farther than into abutment with base plate 12. It is noted that the dimensions and proportionality of the components described with regard to this embodiment can be adjusted for different styles, configurations, and functions for a plunge router 10.

Figure 2:
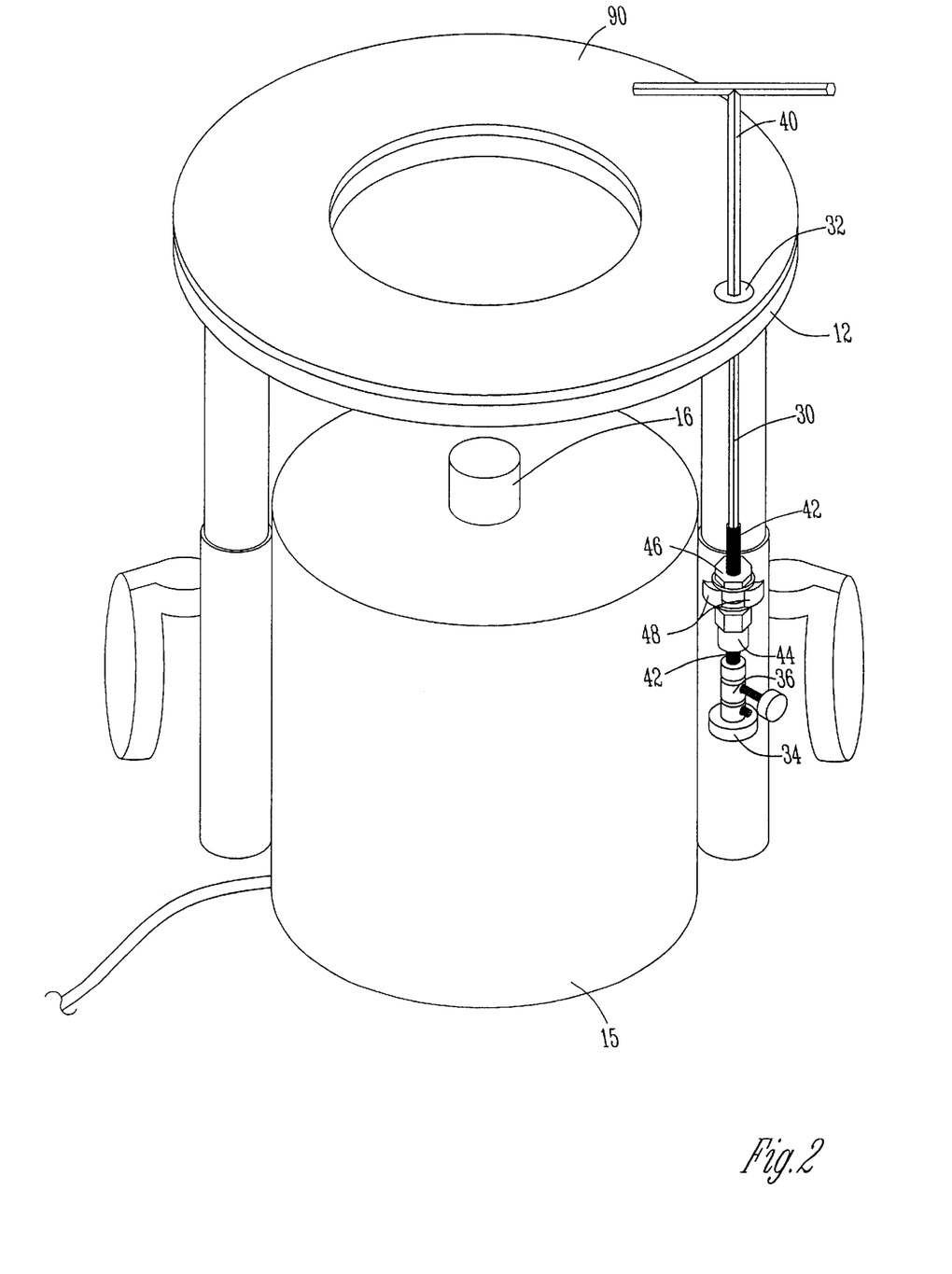
FIG. 2 is a perspective view similar to FIG. 1, except showing the plunge router inverted and an adjustment tool in place at a point accessible to the adjustment mechanism through the base plate of the plunge router.

It should also be noted, however, that drive shaft 30 is connected to drive cap 32 in such a manner that drive shaft 30 is free to rotate relative to base plate 12. Bore 66, (See FIGS. 3A, 4B, and 4C) through the middle of lead screw has an inside cross-sectional shape, which at least at some point mates with the cross-sectional shape of drive shaft 30 so that rotation of drive shaft 30 also causes rotation of lead screw 42. In this embodiment, an insert 71 in end 70 of lead screw 42 has the mating hex shape to that of shaft 30 to cause lead screw 42 to turn with shaft 30. Alternatively, the mating hex portion through lead screw 42 could be formed in a one-piece lead screw 42. Note further that access to and rotation of drive shaft 30 can be accomplished from either end of drive shaft 30, that is, from through the outer facing sub-base 90 of base plate 12 or from the opposite end of router 10. FIG. 2 illustrates router 10 inverted and main drive tool 40 inserted into main drive cap 32 through the outer surface of base plate 12.

FIG. 3A shows in more detail the structural relationship of the components described above. First end 60 of drive shaft 30 can be fixed in drive cap 32 by welding, interference fit, or other manners such as within the skill of those skilled in the art. Second end 62 of drive shaft 30 is fixed to main adjust collar/drive 34 by set screw 63 or other means (pin, weld, etc.). Thus, collar/drive 34 is removable. This allows drive shaft 30 to be inserted through opening 58 in base plate 12 during assembly. Also, this is particularly important when the adjustment mechanism is installed internally of plunge guide member 17A or 17B, as will be discussed later.

As previously mentioned, lead screw 42 rotates with rotation of drive shaft 30 but is longitudinally slideable there-along. Lead screw 42 has external threads 68 and an end flange 70 as shown in FIG. 3A.

The previously described clamping action of fixing nut and adapter-bushing 46 is also shown in FIG. 3A. A narrow portion 72 of fixing nut 44 has internal threads that mate with the external threads 68 of lead screw 42. Wider portion 76 of fixing nut 44 has internal threads 78. The interior diameter of wider portion 76 is spaced from the exterior threads 68 of lead screw 42 to allow passage of an end of adapter-bushing 46, having external threads mating with internal threads 78 of fixing nut 44. Interior bore 80 of adapter-bushing 46 is not threaded such that adapter-bushing 46 can slide along the exterior of lead screw 42. Adapter-bushing 46 has an end flange 82 that is of wider diameter than the other parts of adapter-bushing 46.

As shown in FIG. 3A, fixing nut 44 and adapter-bushing 46 can be turned in opposite directions relative to one another to bring flange 82 closer to the near end of fixing nut 44. Those portions thus can clamp down onto structures such as boss or casting ear 48 of housing 15. Washers 84 and 86 can be used to assist in this clamping.

Once clamped to housing 15, fixing nut 44 and adapter-bushing 46 do not move relative to housing 15. Likewise, lead screw 42 would not ordinarily move relative to housing 15 because of the interlocking of its exterior threads 68 with the interior threads of fixing nut 44.

Therefore, the adjustment mechanism would slide on drive shaft 30 when housing 15 moves over any range of movement allowed. The adjustment mechanism, in particular lead screw 42, fixing nut 44 and adapter-bushing 46, would not affect plunging movement except as a stop for the maximum end of range of plunging movement as previously described. However, as shown in FIG. 3A, when lead screw 42 abuts coarse-adjust collar 36, which in turn abuts main adjust collar/drive 34, drive shaft 30 can be rotated from either end. Such rotation rotates lead screw 42. Fixing nut 44 and adapter-bushing 46 would then travel commensurately along lead screw 42. If drive shaft 30 is turned a certain way, depending upon the threading, lead screw 42 would remain fixed in abutment with coarse-adjust collar 36, but lead screw 42 would move in a direction. Because fixing nut 44 and adapter-bushing 46 are fixed relative to housing 15, housing 15 would thus also move relative to base plate 12. This would affect a change in the distance ($d_{max}$). The amount of possible change is indicated generally at FIG. 3A at $d_{micro}$. Thus, there would also be fine adjustment of bit to base plate over distance $d_{micro}$. This could be accomplished from either end of drive shaft 30; that is, either through the outer surface of base plate 12 or from the opposite end of plunge router 10.

Figure 3B:
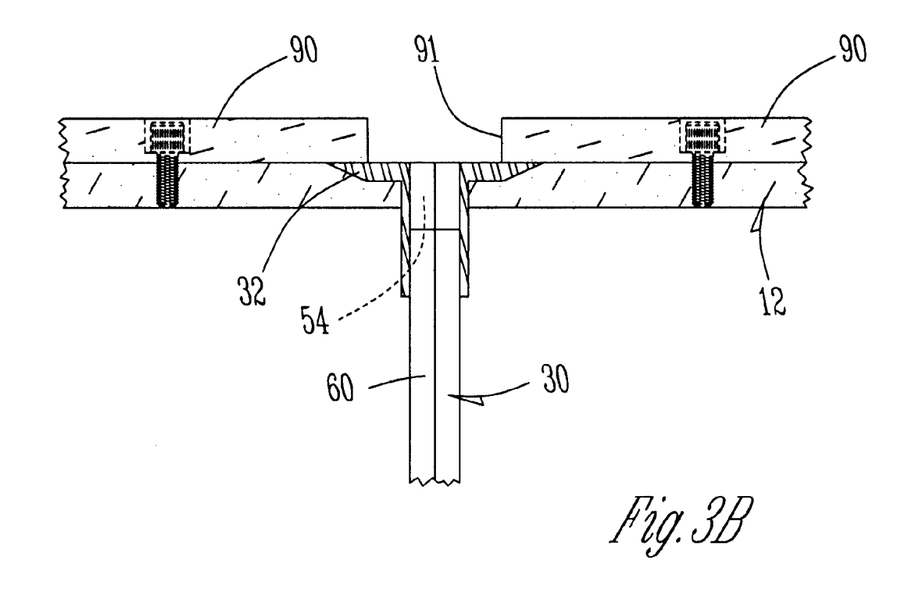
FIG. 3B is a partial view of an alternative embodiment of mounting in a router table.
Figure 5:
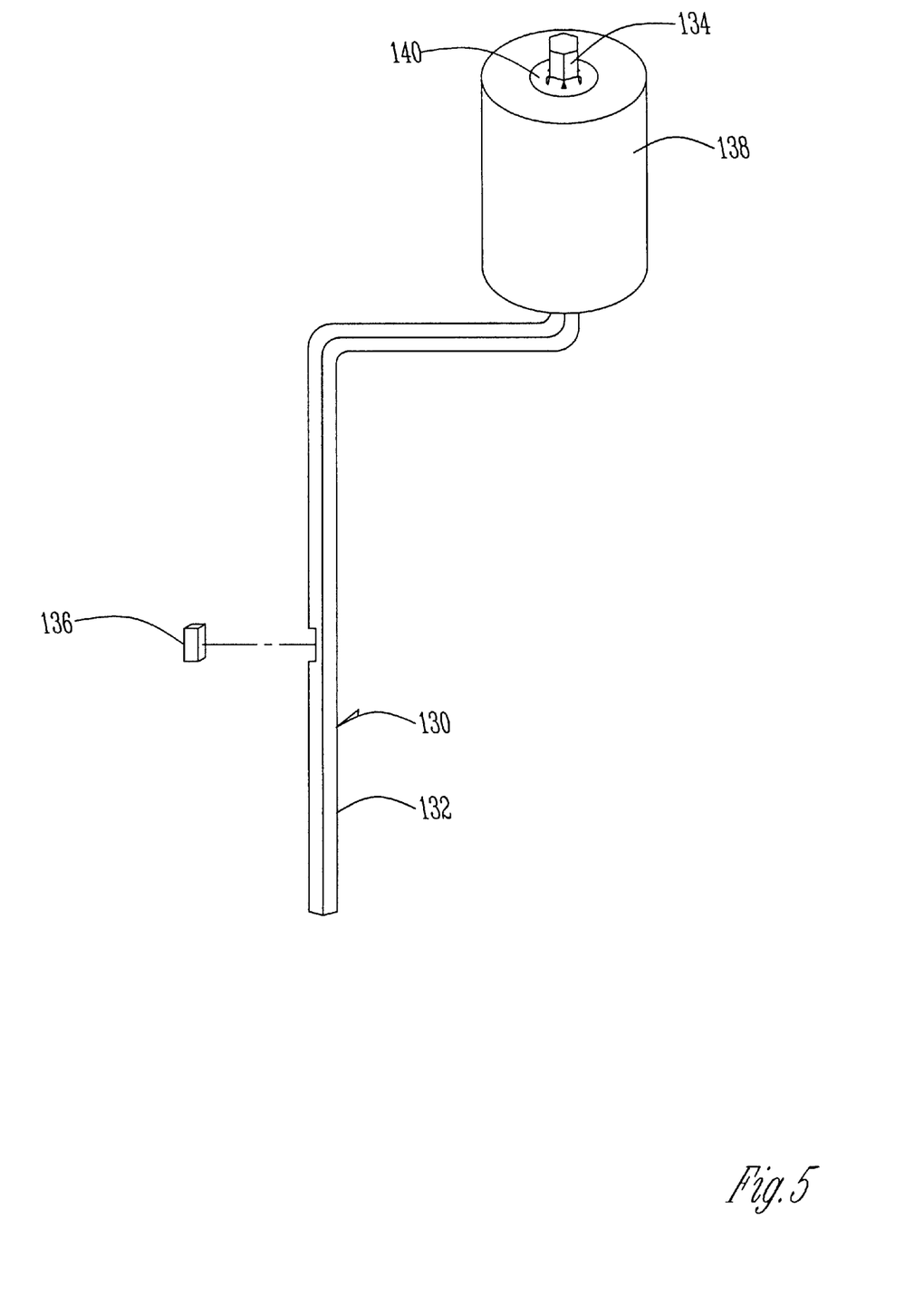
FIG. 5 is an enlarged perspective view of an alternative tool for adjusting the plunge router.

In FIGS. 1 and 2, router 10 is shown in a freestanding, hand-held mode. A beveled bore could be machined into the outer face of base plate 12 into which could matingly seat drive cap 32 (See FIG. 3B). Alternatively, a separate spacer ring 13 (See FIG. 3A) could be provided that is pre-manufactured or customizable by the user to follow the contours of base 12. Spacer ring or gasket 13 could be mountable and sandwiched between outer sub-base 90 and base 12 (by using bolts 19 that are normally used to fix sub-base 90 to base plate 12) and contains a punched hole the same diameter as that of drive cap 32 opening 58. Only a straight bore 91 would have to be made through sub-base 90. No change or machining to base plate 12 is needed. Also, a wear or thrust washer 33 could be placed underneath drive cap 32 to take the wear caused by rotation of drive cap 32 and to take up end play. Washer 33 could be a cup or spring washer. It could be metal (e.g. stainless steel, plastic, or of other material).

FIG. 3A illustrates that spacer ring 13 could also be used if plunger 10 was installed inverted in a router table. In such a case, the sub-base for the router would be replaced by a router table plate which would sandwich spacer 13 to base plate 12 by bolts 19.

Figures 6A, 6B:
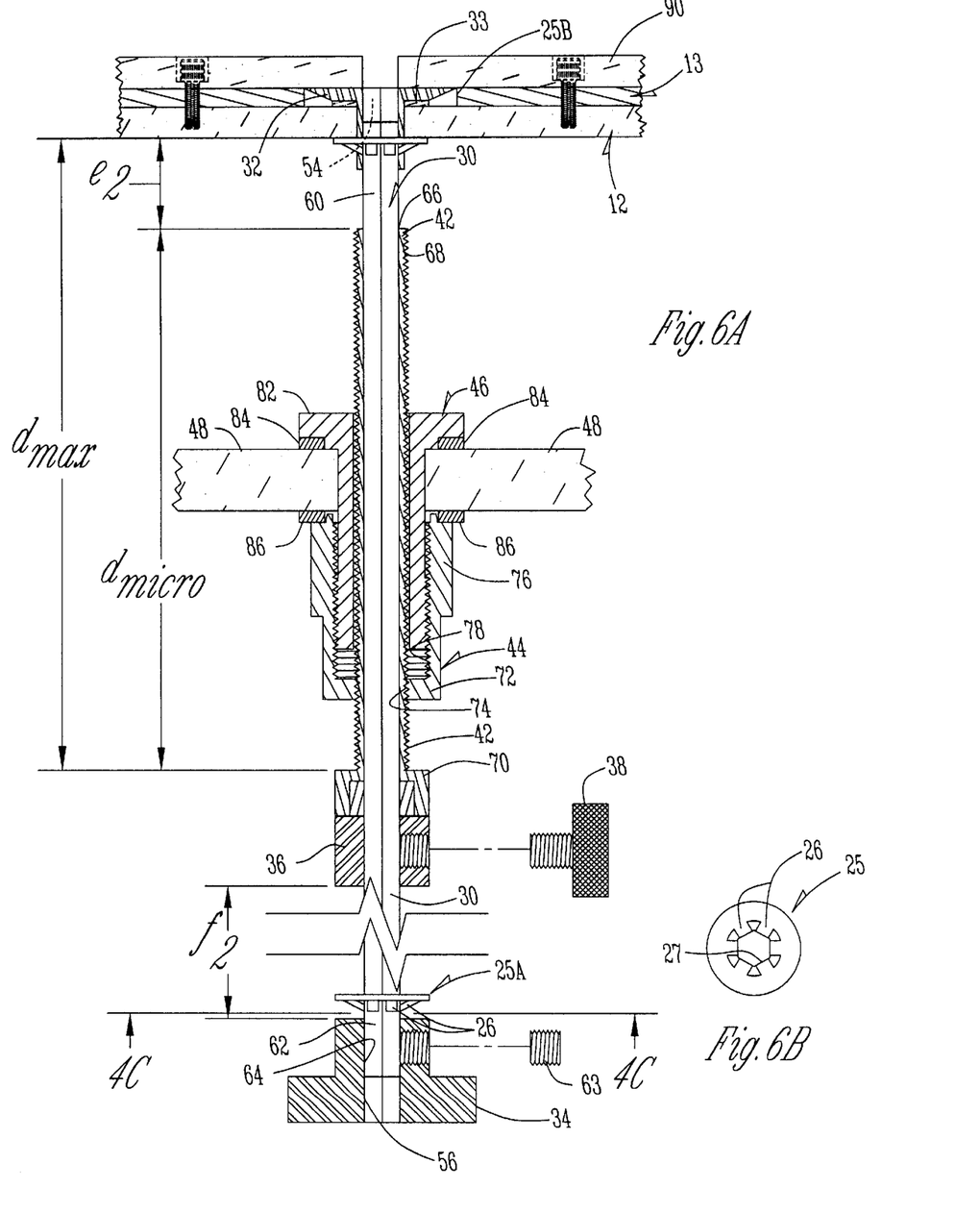
FIG. 6A is similar to FIG. 3A, but shows the quick release and set stop collar for quick, coarse adjustment of a plunge router fixed in a different position than FIG. 3A, and shows an optional lock ring.
FIG. 6B is an enlarged plan view of the lock ring of FIG. 6A.

FIG. 6A illustrates that coarse-adjust collar 36, by the quick and easy release of set screw 38, can be slid along drive shaft 30 out of abutment with main adjust collar/drive 34. For quick or coarse adjustment of $d_{max}$, the operator would manually push housing 15 towards base plate 12, release set screw 38 and slide coarse-adjust collar 36 longitudinally along drive shaft 30 away from main adjust collar/drive 34 to a position desired. Set screw 38 would be quickly reset to lock coarse-adjust collar 36 into place (see for example, FIG. 6A where collar 36 is substantially away from collar/drive 34). In this arrangement, distance $d_{max}$ has been reduced significantly, but very quickly, by simply a resetting of collar 36. The backward biasing of the springs in plunge guide members 17A and 17B would force lead screw 42 into abutment with collar 36, upon release of manual pressure by the operator.

It is to be noted, however, that further adjustment is possible. As shown in FIG. 6A, micro-adjustment over the range $d_{micro}$ still is available. Once collar 36 is set, the operator could, from either end of drive shaft 30, rotate drive shaft 30 and move housing 15 relative to base plate 12 by virtue of movement of fixing nut 44/adapter-bushing 46 along lead screw 42. Collar 36 can thus be used for coarse positioning. Then, rotations of drive shaft 30 could be made for fine or micro-adjustment.

Essentially, collar 36 is a first positioning mechanism. Once set, one can characterize distance $d_{max}$ being at a zero position. Movement over the sub-range distance $d_{micro}$, depending on the location of fixing nut 44 along lead screw 42, can either be plus or minus relative to the "zero" position defined by the fixing of collar 36 along drive shaft 30. That is, if fixing nut 44 is intermediate between ends of lead screw 42, distance $d_{max}$ can either be decreased or increased by some distance despite $d_{max}$ being set by the fixing of collar 36.

It is possible that lead screw 42 can be pushed all the way to abutment with main drive cap 32. Then, the only additional adjustments possible would be the micro-adjustment.

FIGS. 6A and 6B illustrate an optional, well known commercially available external, push-on, lock ring or retainer clip 25 could be pushed down over end 62 of drive shaft 30. Teeth 26 of clip 25 would lock the clip 25 in place. This would prevent lead screw 42 from moving off drive shaft 30 if collar/drive 34 was removed or somehow pushed off.

By comparing FIGS. 3A and 6A, it can be seen that $d_{max}$, roughly the maximum range of adjustability of router housing 15 to base 12, is set by the positioning of collar 36. In FIG. 3A, collar 36 is right against drive 34. (i.e. distance $f_1$ is essentially zero). Thus, full plunging range is available. Distance $d_{max}$ includes as a sub-set distance $d_{micro}$, which is the micro-adjustability of sub-carriage locking nut/adapter-bushing 44/46 along lead screw 42. $D_{max}$ ais the combination of $d_{micro}$ and distance $e_1$, which in FIG. 3A, is big.

In FIG. 6A, by comparison, stop collar 36 is moved a large distance $f_2$ away from end collar 34. This greatly shortens distance $e_2$ (compared to $e_1$). Thus, $d_{max}$ (the combination of $d_{max}$ and $e_2$) is greatly shortened.

FIGS. 1–6 illustrate adjustability from either end of plunge router 10. Drive shaft 30 is rotatably fixed in base plate 12. A carriage or movable combination (here lead screw 42, fixing nut 44, and adapter-bushing 46) provides structure to clamp or connect to housing 15. This carriage is therefore fixable relative to housing 15. In the embodiments of FIGS. 1–6, the carriage connects to housing 15 externally of housing 15 utilizing an existing structural characteristic of housing 15 (e.g. boss 48). The clamping action described accomplishes this connection.

As mentioned, alternatively, the adjustment mechanism could be installed interiorly of a plunge guide member 17A or 17B. By referring to FIG. 7, the basic structural components are the same as the FIGS. 1–6. The only major difference is that the clamping of adapter-bushing 46 and fixing nut 44 would be to opposite sides of a fixed end cap of the hollow receiver 20A, through which would be positioned drive shaft 30. The main drive cap 32 would again be longitudinally fixed in base plate 12, here directly underneath support column 18A. Drive shaft 30 would essentially be hidden from view except for its end that extends beyond plunge guide member 17A, and would include adjust collar/drive 34 and collar 36. Pre-existing adjustment structure, if any, would be removed, if the adjustment mechanism according to the present invention of FIG. 7 was installed; or the adjustment mechanism would be originally installed in this fashion. Thus, nut 44/bushing 46 would clamp on opposite sides of end cap 102 (a part of housing 15). Collar 36 and drive 34 are accessible, as is drive 32. Both coarse and micro-adjustment are possible.

Figure 7:
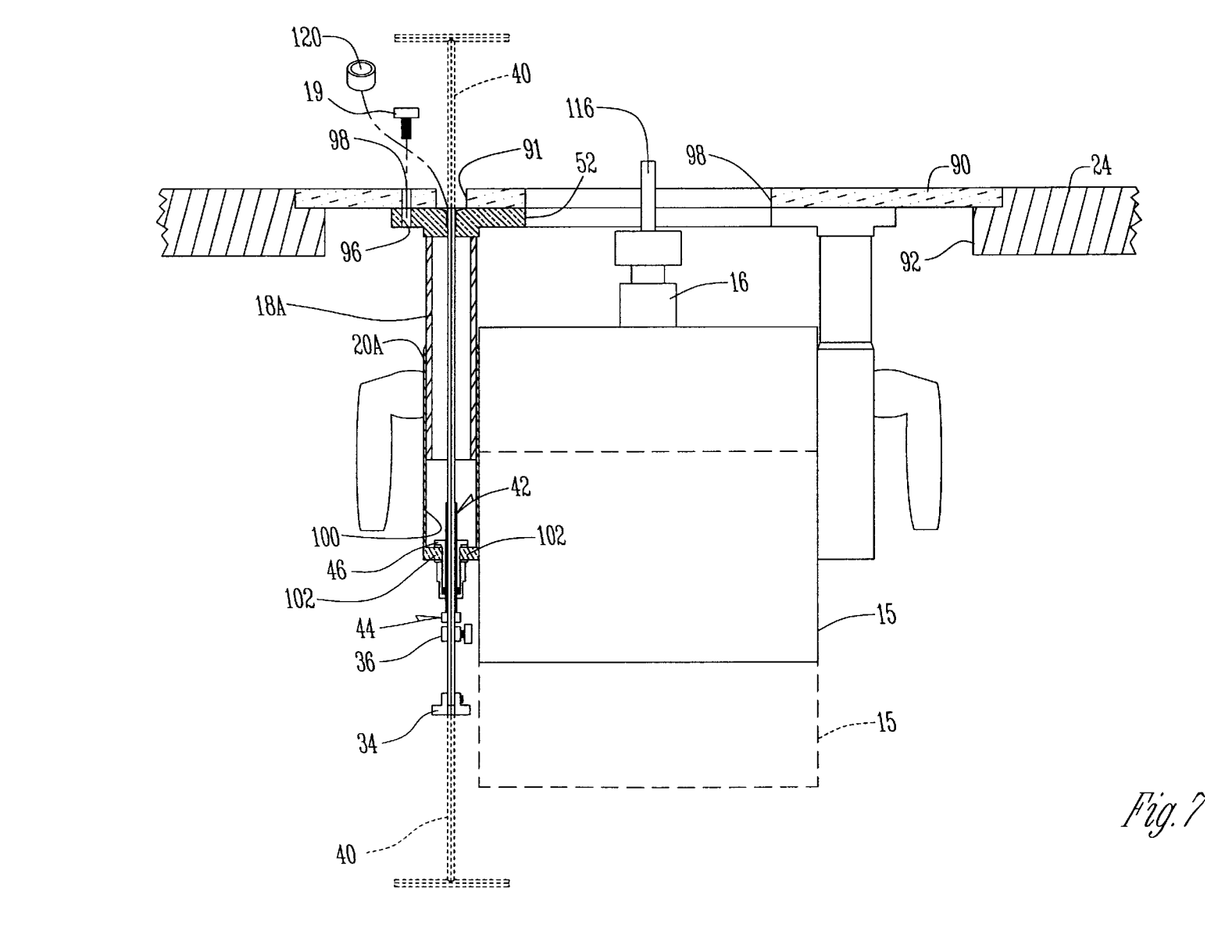
FIG. 7 is a partial sectional elevational view of an alternative embodiment of the adjustment mechanism according to the present invention installed interiorly of a plunge support member of the plunge router and where the plunge router is installed in an inverted fashion in a router table.

FIG. 7 shows router 10 inverted, base plate bolted by bolts 94 to a router table insert plate 90, and insert plate 90 inserted into a mating groove and opening in a router table 24. FIG. 7 illustrates a bit 116 in bit chuck 16 of router 10.

Stop collar 36 is positioned so as to bring housing close to base plate 12 to that bit 116 extends above the plane of table 24. Thus, the plunging capability of router 10 has been essentially disabled to make plunge router 10 function like a table router.

Importantly, though, micro-adjustability is still available by turning drive shaft 30 with a tool from either end of drive shaft 30. Bit height of bit 116 can thus be easily and precisely adjusted over the $d_{micro}$ range, even in the configuration of FIG. 7.

The invention, therefore, provides a straightforward way to allow adjustment from top or bottom of a plunge router. Importantly, the arrangement can be used with almost any, if not all, existing plunge routers. It is therefore basically universal in nature. It can also be retrofitted in most, if not all plunge routers. It is to be understood that this retrofitting could be through the interior of a support column 18 and receiver 20 or could be external of components of the plunge router (i.e. connected between the base-plate 12 and the router 10, but external instead of internal as shown in the disclosure).

The arrangement also does not materially interfere with other operations of the plunge router. It still allows the plunging operation; therefore, it is useful even when the plunge router is used in the hand-held and manipulated mode.

Operation

Operation of the plunger router 10 of FIGS. 1–5 is as follows. Drive shaft 30 would be rotatable but longitudinally fixed relative to base plate 12. Lead screw 42 is fixed to some point of housing 15 by use of fixing nut 44/adapter-bushing 46 clamping action. The position of collar 36 would be selected by the operator. The plunger router housing 15 would be manually moved against the biasing springs a distance to allow collar 36 to be moved along drive shaft 30 to the desired position where it would be fixed in place by setting set screw 38. The plunger router housing 15 would be released and the springs of the plunge mechanisms would bias housing 15 upwardly until lead screw 42 abutted collar 36. Any fine or micro-adjustment of the bit relative to base plate 12 could be accomplished by rotating drive shaft 30, from either end. The same tool 40 could be used for either end. For quick coarse re-adjustment, stop collar 36 could be repositioned. Micro-adjustment would then again be possible.

Options and Alternatives

It will be appreciated that the present invention can take many forms and embodiments. The true essence and spirit of this invention are defined in the appended claims and it is not intended that the embodiments of the invention presented herein should limit the scope thereof. Variations obvious to one skilled in the art will be included within the invention defined by the claims.

For example, the adjustment mechanism described can be made out of metal, for example steel or aluminum. Other materials or combinations of materials are possible.

The length, position, and dimensions of the components can vary according to type and configuration of plunge router and the needs of any particular situation.

Different configurations of main drive tool 40 are possible. A T-handle is one embodiment. An L-shaped handle is also possible. A crank handle is another possibility (See FIG. 5). Crank handle 130 includes a drive end 132 and a handle 138 rotatable on opposite end 134. A locking or retainer clip 140 (like clip 25 of FIG. 6B could retain handle 138. Optionally, a magnetic insert 136 could be fixed into the side (or end) of tool 130. It is also possible to add a bracket or other structure to plunge router 10 so that handle 40 can be releasably mounted on plunge router 10 so as to be always and conveniently available.

The manner in which plunge router 10 can be mounted to a router table can vary and is well within the skill of those of ordinary skill in the art. It is therefore not described in detail herein. Examples can be found in the patents incorporated by reference herein. FIG. 7 illustrates that base plate 12 could be bolted by bolts 94 to a router table insert 90 that could be set into a corresponding opening in a router table 24. Other configurations are possible.

It has been found that the embodiment of FIG. 7 preferably has main drive cap 32 recessed from the surface of the router table or router plate 90. This can result in sawdust or debris accumulating in the recess 91, making it difficult for tool 40 to engage drive cap 32.

One solution is to insert a ferro-magnetic plug 120 of approximate matching shape to the recess 91 and of a thickness that results in a smooth surface for router table surface 90 during operation of the router. If adjustment is needed to plunge router 10, or other access to the recess or main drive cap 32, a complimentary magnetized member can be used to remove the plug. For example, the complimentary magnetized member could be part of the handle or shaft to tool 40, for convenience (e.g. See insert 136 of FIG. 5).

The invention maintains most, if not all plunge features including, but not limited to, plunge stroke, depth of turret stop, post-lock, bit position adjustment and micro-adjustment in hand-held or tabletop use, all as are known in the art.

If retrofitting the invention of the preferred embodiment for an existing adjustment mechanism for a plunge router, the following format is generally followed. The sub-base is removed from the plunge router using attachment screws. A roll pin securing a threaded adjustment screw or shaft to the base plate is driven out. A shorter pin is driven back in to secure post 18A or 18B to base 12. Adapter-bushing 46 is inserted into the receiver of the plunge guide member. Drive shaft 30 is inserted through the hollow post or support column and hollow receiver and through bushing 46. The opening into the receiver may have to be enlarged. Fixing nut 44 is then placed on lead screw 42 and both are slid down drive shaft 30. Fixing nut and adapter-bushing 46 are threaded together until the clamping action of fixing nut and adapter-bushing 44/46 occurs relative to the top end cap of the receiver of plunge guide member. This should all be accomplished while the housing 15 is manually forced downward to plate 12. Many plunge routers 10 have separate post-locks that can lock a plunge router in that position. Coarse-adjust collar 36 would then be slid onto drive shaft 30 to the desired position and main adjust collar/drive 34 placed on the end of drive shaft 30, and set screw 63 used to fix it in place. If clip 25 were used, it would be positioned prior to drive 34 on shaft 30.

The components for fixing the housing to the adjustment mechanism of the invention could vary. For example, a worm gear and some type of rack could be used instead of a lead screw and fixing nut. A worm gear could be slideably mounted on shaft 30 and configured to turn with shaft 30. A corresponding rack could be fixed to housing 15. Other configurations are possible.

What is claimed is:

1. A plunge router adjustment mechanism comprising:
   an elongated member having first and second ends;
   a mounting member on said first end adapted for mounting said first end in a base of a plunge router;
   a carriage adjustably moveable along the elongated member allowing some plunging movement, and an adjustable connection adapted to engage the carriage relative a plunge router housing;
   a stop member adjustably positionable along the elongated member to define end of travel of the carriage in a direction opposite the base along the elongated member;
   so that when installed, adjustment of said stop member along said elongated member sets the maximum distance between router bit and the router base.

2. The mechanism of claim 1 further comprising a sub-carriage adjustably moveable along the carriage and an adjustable connection on the sub-carriage so that (a) the sub-carriage is adjustable relative to the carriage and (b) the sub-carriage and carriage are adjustable relative to the elongated member.

3. The mechanism of claim 2 further comprising a connection on said first end of the elongated member for connection of a tool for rotating the elongated member.

4. The mechanism of claim 3 further comprising a connection at or towards a second end of the elongated member adapted to allow manual rotation or connection to a tool to rotate the elongated member.

5. The mechanism of claim 2 wherein the carriage comprises a component slideable along but rotatable with the elongated member, and the sub-carriage comprises another component along the carriage.

6. The mechanism of claim 5 wherein the component comprises a lead screw.

7. The mechanism of claim 6 wherein the another component comprised a threaded bushing.

8. The mechanism of claim 2 wherein the adjustable connection comprises a clamping mechanism.

9. The mechanism of claim 7 wherein the clamping mechanism and adapter bushing are threadably adjustable longitudinally along the lead screw.

10. The adjustment mechanism of claim 1 in combination with a plunge router having a base plate and a housing with an exterior, and the base plate is connected to the housing by plunge guide members.

11. The adjustment mechanism of claim 10 wherein the elongated member is external of said housing and the adjustable connection fixes the carriage to an external feature of the housing.

12. The adjustment mechanism of claim 10 wherein the adjustment mechanism extends through a plunge guide member and the connection fixes the carriage to the housing.

13. The adjustment mechanism of claim 1 wherein said adjustment mechanism is retrofittable to a plunge router.

14. The mechanism of claim 1 wherein said adjustment mechanism is installed as original equipment to a plunge router.

15. The mechanism of claim 1 wherein said mounting member is rotatable relative to the base but does not allow longitudinal movement of the elongated member relative to the base.

16. The mechanism of claim 1 wherein the connection includes a drive socket.

17. The mechanism of claim 16 further comprising a tool having a head matable with said drive socket.

18. The mechanism of claim 1 wherein the member includes a drive socket.

19. The mechanism of claim 18 further comprising a tool with a drive head matable with said drive socket of the member.

20. The mechanism of claim 1 in combination with a plunge router having a base, the base being adapted to be mounted in a router table.

21. The mechanism of claim 1 further comprising a manually controllable fixing member to fix the collar in position along the elongated member.

22. A method of adjustment of a plunge router comprising:
   incorporating a first member to adjust the distance between a bit and a base on the router over a range;
   positioning said member so that it can be accessed and operated from either through said base or at an opposite end of the router.

23. The method of claim 22 further comprising incorporating a second mechanism to adjust the distance between the bit and base independent of the first member.

24. The method of claim 23 wherein the first member allows adjustment over said range and said second member allows adjustment over a sub-set of said range.

25. The method of claim 22 further comprising limiting said range.

26. The method of claim 22 comprising retrofitting the member to a plunge router.

27. The method of claim 22 further comprising incorporating the member as original equipment to a plunge router.

28. The method of claim 22 wherein the member is mounted externally of the housing of the plunge router.

29. The method of claim 22 wherein the member is installed internally of the plunge guide member of the plunge router.

30. A plunge router adjustment mechanism comprising:
   a plunge router having a housing with a bit chuck at a base end, an opposite end, and a plunge mechanism biasing a base to an extended position, but allowing movement of a base over a range between extended and nearest positions;
   means accessible from the base end and the opposite end of the housing to adjust and fix the distance between the base and the housing over said range.

31. The mechanism of claim 30 further comprising means to adjust the distance between the base and the housing independently over a sub-set of said range.

* * * * *